(12) United States Patent
Zagorski et al.

(10) Patent No.: US 10,252,490 B2
(45) Date of Patent: Apr. 9, 2019

(54) METHOD AND SYSTEM FOR REINFORCED PIPE INSULATION

(75) Inventors: Kenneth L. Zagorski, Houston, TX (US); Joseph Donoghue, Houston, TX (US); Mike Bock, Cypress, TX (US)

(73) Assignee: Rilco Manufacturing Company, Inc., Houston, TX (US)

( * ) Notice: Subject to any disclaimer, the term of this patent is extended or adjusted under 35 U.S.C. 154(b) by 427 days.

(21) Appl. No.: 13/406,561

(22) Filed: Feb. 28, 2012

(65) Prior Publication Data

US 2013/0022783 A1 Jan. 24, 2013

Related U.S. Application Data

(60) Provisional application No. 61/508,865, filed on Jul. 18, 2011.

(51) Int. Cl.

| | | |
|---|---|---|
| *B32B 7/12* | (2006.01) | |
| *B32B 3/26* | (2006.01) | |
| *B32B 3/08* | (2006.01) | |
| *B32B 1/08* | (2006.01) | |
| *F16L 59/135* | (2006.01) | |

(Continued)

(52) U.S. Cl.
CPC ............ *B32B 7/12* (2013.01); *B29C 37/0085* (2013.01); *B32B 1/08* (2013.01); *B32B 3/08* (2013.01); *B32B 3/266* (2013.01); *F16L 59/024* (2013.01); *F16L 59/029* (2013.01); *F16L 59/135* (2013.01); *B32B 2597/00* (2013.01); *Y10T 428/24298* (2015.01); *Y10T 428/24322* (2015.01)

(58) Field of Classification Search
CPC .. B32B 3/266; B32B 3/08; B32B 7/12; B32B 1/08; B32B 2597/00; B29C 37/0085; F16L 59/024; F16L 59/135; F16L 59/029; F16L 2597/00; Y10T 428/24322; Y10T 428/24298
USPC .................................................. 428/134, 137
See application file for complete search history.

(56) References Cited

U.S. PATENT DOCUMENTS

| | | | |
|---|---|---|---|
| 2,509,494 A | | 5/1950 | Gruenwald |
| 3,814,723 A | * | 6/1974 | Tanaka et al. ................ 524/500 |

(Continued)

FOREIGN PATENT DOCUMENTS

| | | |
|---|---|---|
| CA | 434270 | 4/1946 |
| EP | 0069543 | 1/1983 |

(Continued)

*Primary Examiner* — Nathan L Van Sell
(74) *Attorney, Agent, or Firm* — The Petruzzi Law Firm; James D. Petruzzi (57) ABSTRACT

A reinforced insulation material having one or more sheets of insulation material having a plurality of voids in each sheet, wherein the sheets are operably connected to each other in a layered configuration, the voids mate to each other to create cylindrical or rectilinear pathways for insertion of adhesive or synthetic material to adhere the sheets into a layered or sandwiched configuration. The voids may be a variety of shapes including circles, squares, rectangles or other suitable shapes that upon formation of the layered sheets line up to permit insertion of material or dowels to create a reinforced assembly. The layers may be formed into a variety of shapes including a semicircular shape to go around a pipe, or a block of material. The finished assembly withstands compressive forces and provides insulation when in place around pipes or under tanks.

6 Claims, 8 Drawing Sheets

(51) Int. Cl.
*F16L 59/02* (2006.01)
*B29C 37/00* (2006.01)

(56) References Cited

U.S. PATENT DOCUMENTS

| | | | |
|---|---|---|---|
| 4,063,344 A * | 12/1977 | Jones et al. | 29/890.034 |
| 4,140,484 A | 2/1979 | Payne | |
| 4,179,319 A * | 12/1979 | Lofdahl | 156/86 |
| 4,287,245 A | 9/1981 | Kikuchi | |
| 4,849,276 A | 7/1989 | Bendig et al. | |
| 4,852,831 A * | 8/1989 | Sandstrom | F16L 59/135 |
| | | | 138/149 |
| 5,038,541 A | 8/1991 | Gibbar, Jr. | |
| 5,078,346 A * | 1/1992 | Deichman | F16L 59/135 |
| | | | 248/351 |
| 7,213,790 B2 | 5/2007 | Bailey | |
| 7,226,969 B2 * | 6/2007 | Ristic-Lehmann et al. | 524/544 |
| 7,950,605 B2 | 5/2011 | Howard | |
| 8,505,857 B2 | 8/2013 | Mark | |
| 2004/0142149 A1 * | 7/2004 | Mollendorf et al. | 428/156 |
| 2005/0253024 A1 | 11/2005 | Zagorski et al. | |
| 2006/0010831 A1 | 1/2006 | Skakie | |
| 2006/0263587 A1 * | 11/2006 | Ou et al. | 428/292.1 |
| 2007/0102055 A1 * | 5/2007 | Blair et al. | 138/114 |
| 2007/0154698 A1 * | 7/2007 | Stepanian | 428/294.7 |
| 2007/0221284 A1 * | 9/2007 | Chenin et al. | 138/149 |
| 2007/0264472 A1 * | 11/2007 | Bozhevolnaya et al. | 428/156 |
| 2008/0087870 A1 * | 4/2008 | Williams et al. | 252/609 |
| 2009/0049868 A1 | 2/2009 | Malloy | |
| 2009/0301596 A1 * | 12/2009 | van Oosten | 138/149 |
| 2009/0324871 A1 * | 12/2009 | Henn | 428/69 |
| 2010/0154917 A1 | 6/2010 | Batallas et al. | |
| 2011/0052897 A1 | 3/2011 | Goto et al. | |
| 2011/0252739 A1 * | 10/2011 | Leeser | B32B 3/266 |
| | | | 52/741.3 |
| 2012/0073693 A1 * | 3/2012 | Collier et al. | 138/103 |
| 2013/0022769 A1 * | 1/2013 | Sabri et al. | 428/36.5 |

FOREIGN PATENT DOCUMENTS

| | | | | |
|---|---|---|---|---|
| EP | 3205957 | | 9/1983 | |
| JP | S53 19910 | | 2/1978 | |
| JP | S58 65396 | | 4/1983 | |
| JP | S60 183269 | | 9/1985 | |
| JP | H05-83052 | | 4/1993 | |
| JP | H10-205684 | | 8/1998 | |
| JP | 2011-73959 | | 4/2011 | |
| KR | 976421 B1 * | 7/2010 | | B32B 5/04 |
| KR | 100967421 B1 * | 7/2010 | | B32B 5/04 |
| WO | 2010 077595 | | 7/2010 | |

* cited by examiner

SECTION VIEW

SECTION B-B

SECTION A-A

SECTION C-C

PRIOR ART

METHOD AND SYSTEM FOR REINFORCED PIPE INSULATION

CROSS REFERENCE TO RELATED APPLICATIONS

This application is based on provisional application Ser. No. 61/508,865, filed on Jul. 18, 2011 which is incorporated as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

This Invention relates to insulated pipes and tank bases. In particular this invention relates to a method and system for insulating pipes with flexible reinforced material as well as the insulation of tank bases.

BACKGROUND OF THE INVENTION

Currently, pipe and other conduit used in various industrial applications including refineries are insulated by wrapping insulation in a continuous overlapping pattern. When the insulation approaches the location near where the pipe is supported, it must be stopped and restarted before and after the pipe support to maintain the load bearing characteristics of the pipe support. In this region where the pipe is supported, the wrapped insulation is positioned about the pipe in increased diameters of insulation to provide adequate insulation and maintain the proper load bearing characteristics. This is wasteful and creates areas of compromised insulation prone to thermal leakage and breaking of the insulation due to movement of the pipes caused by stresses placed on the pipe due to fluids or gases moving through the pipe. There thus exists a need to configure flexible insulation material in a manner to withstand compressive forces while maintaining a low profile about a pipe or other longitudinal member. In addition current methods of insulating tank bases require the use of very thick insulation that increases the overall height of a given tank. The use of the new insulation material reduces the tank height thus saving significantly on the materials required to build the tank.

In accordance with a preferred embodiment of the invention, there is shown a reinforced insulation material having one or more sheets of insulation material having a plurality of voids in each sheet, wherein the sheets are operably connected to each other in a layered configuration, the voids on each sheet are oriented in a mating pattern that generally forms cylindrical regions on the layered configuration, and a synthetic material inserted into the voids of each sheet to connect the sheets to each other.

In accordance with a preferred embodiment of the invention, there is shown a reinforced insulation material having a plurality of sandwiched sheets of insulation material, each sheet having a plurality of voids, the voids on each sheet oriented in a mating pattern to the voids on the other sheets to form cylindrical voids when connected together and a synthetic material inserted into the voids of each sheet to connect the sheets.

In accordance with a preferred embodiment of the invention, there is shown a reinforced insulation material having one or more sheets of insulation material having a void in each sheet, wherein the sheets are operably connected to each other, the void on each sheet oriented in a mating pattern to the void on said other sheets to form a three dimensional void when connected together, and a synthetic material inserted into the voids of each sheet to connect the sheets.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
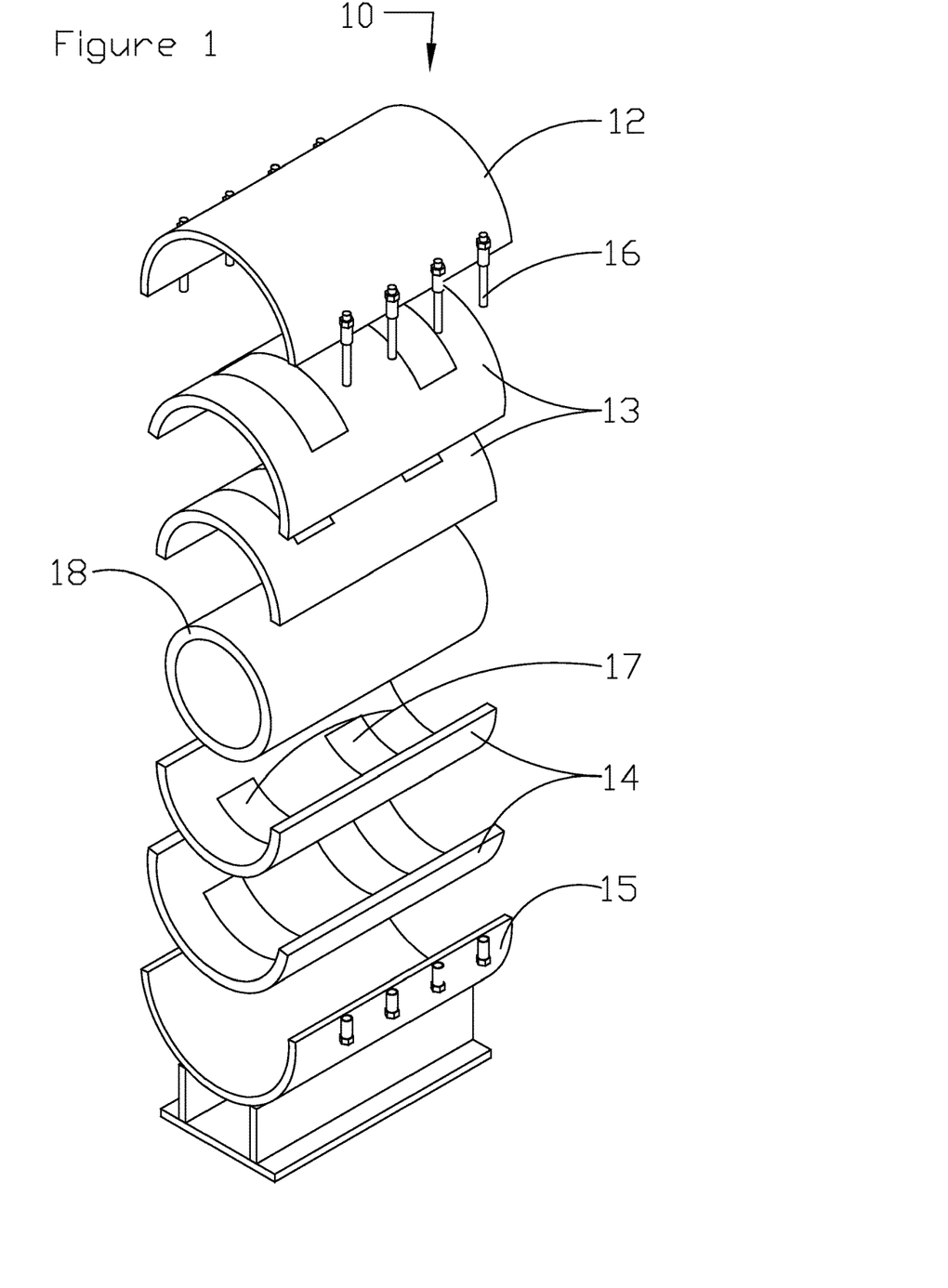
FIG. 1 shows an exploded view of a pipe insulation assembly according to a preferred embodiment of the invention.

Turning now to FIG. 1, there is shown an exploded view of a pipe support and insulation assembly according to a preferred embodiment of the invention.

Bottom cradle 15 is a conventional pipe cradle having a semicircular configuration for the reception of a cylindrical pipe 18. Cylindrical pipe 18 must be insulated while at the same time the insulation must be able to withstand the loads and stresses that are applied to the pipe at the support location.

Insulation upper sheets 13 and insulation lower sheets 14 are configured in semicircular pieces to fit around cylindrical pipe 18. The insulation upper sheets 13 and insulation lower sheets 14 are shown as two separate sheets but may be of any of a number of sheets depending on the application. Insulation upper sheets 13 and insulation lower sheets 14 are configured with a pattern of rectilinear voids or block stiffeners 17 as to permit stiffener material to be inserted into insulation upper sheets 13 or insulation lower sheets 14 to be stacked while still maintaining a longitudinal rectangle of space through the series of sheets. As more fully described below, the rectangular spaces may be filled with stiffener which may be comprised of a variety of materials as described below. Once insulation upper sheets 13 are stacked and suitable stiffening material is added, the insulation upper sheets 13 form a rigid semicircular member that goes around the outer diameter of half of cylindrical pipe 18.

An insulation composite consisting of a flexible sheet type insulation with structural insulation inserts of the present invention solves these problems. The flexible sheet type insulation, while vastly superior to other insulations with regards to thermal performance, has very low design compressive strength values. This renders the flexible sheet type insulation poorly suited for situations which require the insulator to resist compressive forces. In order to increase the flexible sheet type insulation's compressive strength values, structural inserts must be placed in the insulation.

Figure 2:
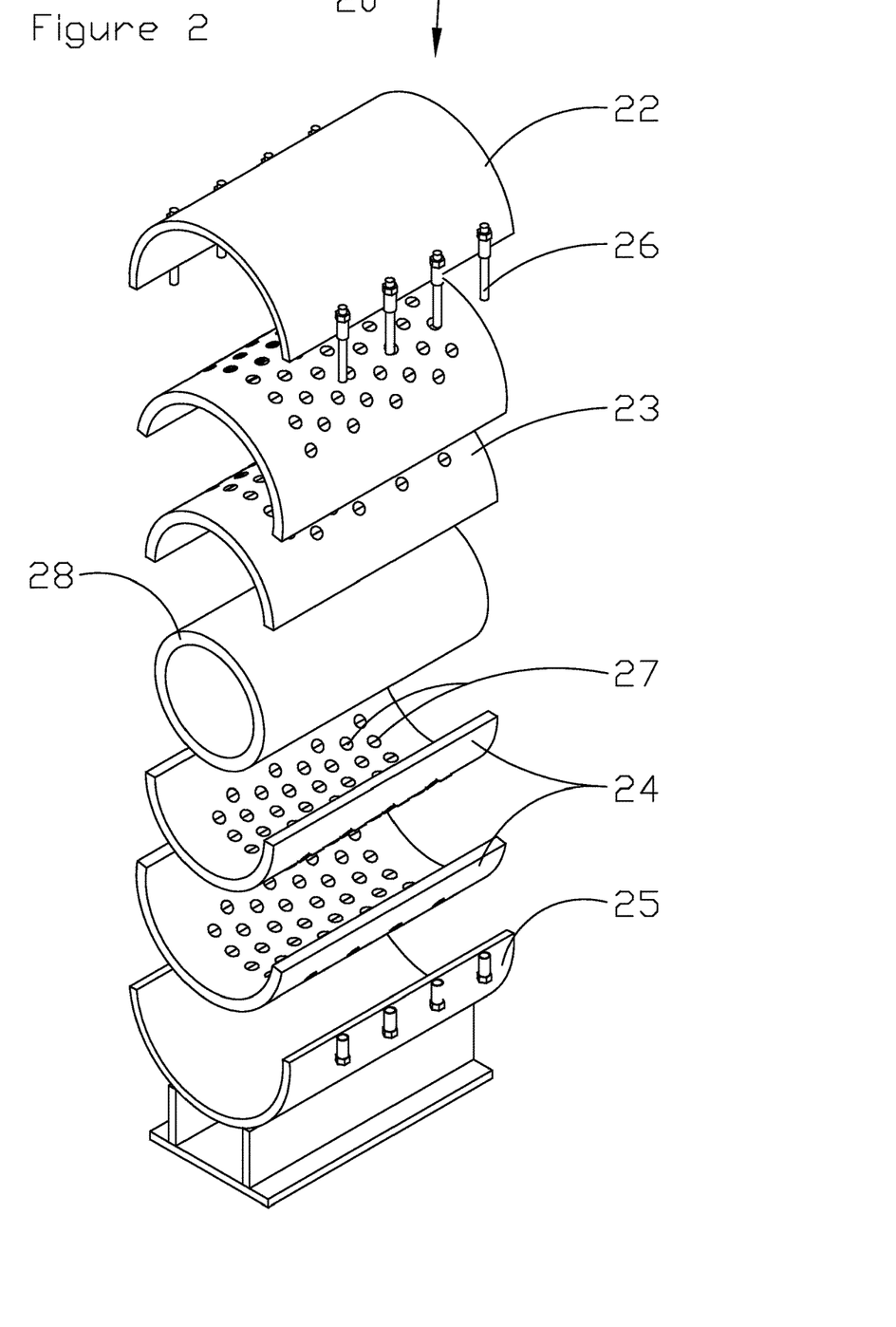
FIG. 2 shows an exploded view of a pipe insulation assembly according to another preferred embodiment of the invention.

Turning now to FIG. 2, there is shown an exploded view of a pipe support and insulation assembly according to another preferred embodiment of the invention. Insulation upper sheets 23 and insulation lower sheets 24 are configured in semicircular pieces to fit around cylindrical pipe 28. The insulation upper sheets 23 and insulation lower sheets 24 are shown as two separate sheets but may be of any of a number of sheets depending on the application. Insulation upper sheets 23 and insulation lower sheets 24 are configured with a pattern of holes as more fully shown in FIGS. 5 and 9 to permit the mating sheets on insulation upper sheets 23 or insulation lower sheets 24 to be stacked while still maintaining a longitudinal cylinder of space through the series of sheets. As more fully described below, the cylindrical spaces may be filled with stiffener which may be comprised of a variety of materials as described below. Once insulation upper sheets 23 are stacked and suitable stiffening material is added, the insulation upper sheets 23 form a rigid semicircular member that goes around the outer diameter of half of cylindrical pipe 28.

Turning to FIG. 1, the two semicircles of insulating material are fixedly attached about cylindrical pipe 18 by top cradle 12 and bottom cradle 15 via bolts 16. Any number of mechanisms may be used to connect top cradle 12 and bottom cradle 15 such as clamps, ties or other means. Further, top cradle 12 and bottom cradle 15 may be of a clamshell configuration with a hinged side and have bolts or other fixation mechanism to connect the opposing side. Once configured, the insulation upper sheets 13 and insulation lower sheets 14 form an impermeable thermal layer about cylindrical pipe 18 at the point of contact with top cradle 12 and bottom cradle 15. By using layers of insulation, such as aerogel based insulation layers, thin layers of highly thermal insulation may be configured into a stiff internal shell about cylindrical pipe 18 for affixation in top cradle 12 and bottom cradle 15. One commercially available such insulation is sold under the trademark, Cryogel®. This stiffening of the insulation as more fully described below, creates an insulating layer that is both thermally sound and capable of handling the loads applied to the pipe during operation.

Similarly, lower insulation sheets 14 are configured for reception of stiffener and once constructed may be placed about the lower half of cylindrical pipe 18.

As shown in FIG. 2, the two semicircles of insulating material are fixedly attached about cylindrical pipe 28 by top cradle 22 and bottom cradle 25 via bolts 26. Any number of mechanisms may be used to connect top cradles 22 and bottom cradle 25 such as clamps, ties or other means. Further, top cradle 22 and bottom cradle 25 may be of a clamshell configuration with a hinged side and have bolts or other fixation mechanism to connect the opposing side. Once configured, the insulation upper sheets 23 and insulation lower sheets 24 form an impermeable thermal layer about cylindrical pipe 28 at the point of contact with top cradle 22 and bottom cradle 25. By using layers of insulation, such as aerogel based insulation layers, thin layers of highly thermal insulation may be configured into a stiff internal shell about cylindrical pipe 28 for affixation in top cradle 22 and bottom cradle 25. This stiffening of the insulation as more fully described below, creates an insulating layer that is both thermally sound and capable of handling the loads applied to the pipe during operation.

The inserts can be mated with the flexible insulation using several different methods as noted above. The most cost effective methods appear to be either injecting polyurethane foam into cavities cut into the flexible sheet type insulation, which expands and hardens during the curing process, naturally bonding to the flexible insulation or creating structural shapes and then gluing the inserts into the cavities.

Top cradle 22 and bottom cradle 25 are bolted together with bolts 26 to form a rigid insulating covering to cylindrical pipe 28.

The flexible sheet type insulation with structural inserts can be manufactured into different shapes. The two most common shapes being the constant radius arc (pipe covering) and a flat block. The inserts' density and spacing between one another is load dependent. The higher the load, the spacing between the inserts should be decreased or the density should be increased or a combination of both. The ideal composite configuration has the lowest density inserts with the greatest amount of space between one another in order to minimize the negative impact on the overall thermal performance.

Figure 3:
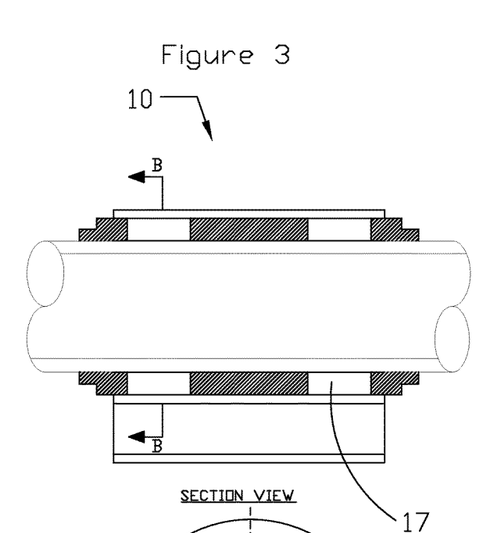
FIG. 3 shows a cross sectional view of a pipe insulation assembly and pipe according to a preferred embodiment of the invention.

FIG. 3 shows a side view of a pipe and insulation assembly with block stiffeners 17 positioned in the insulation.

Figure 4:
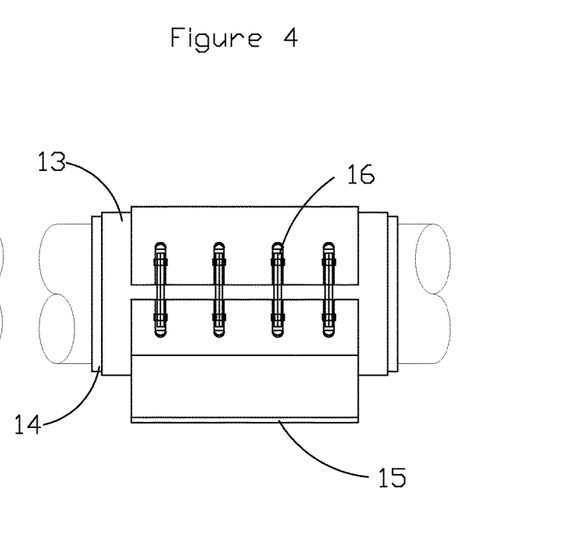
FIG. 4 shows a side view of a pipe insulation assembly and pipe according to a preferred embodiment of the invention.

FIG. 4 shows a side elevational view of insulations upper sheets 13 and insulation lower sheets 14 positioned about the pipe and set in bottom cradle 15 that is secured with bolts 16.

Figure 5:
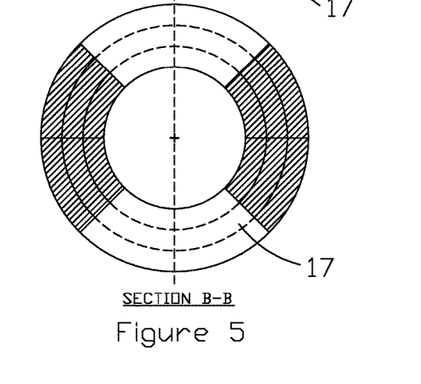
FIG. 5 shows a cross section along lines B-B of FIG. 3.

FIG. 5 shows a cross sectional view of a completed series of sheets with block stiffeners 17 positioned in the rectilinear voids previously described. As is readily apparent, the individual sheets have different sizes of voids to accommodate the increased diameter as each sheet is placed one on top of the other. This results in a greater amount of stiffener material in the outer sheet than the inner sheet.

Figure 6:
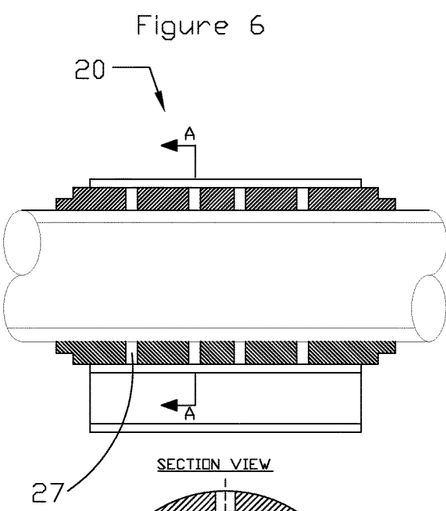
FIG. 6 shows a cross sectional view of a pipe insulation assembly and pipe according to a preferred embodiment of the invention.

Turning to FIG. 6, a second embodiment is shown in cross sectional view of a completed series of sheets with block stiffeners 27 positioned in the cylindrical voids previously described. As is readily apparent, the individual sheets have cylindrical voids in different positions so that when positioned together they create a single cylindrical tube in which stiffener material may be added. Thus, each sheet of insulation material preferably has a pattern of holes drilled or cut in the material. Each sheet of material has a similar pattern of holes configured in such a way as to create cylindrical tubes when two or more sheets are stacked together. As is readily apparent, to configure a series of sheets that conform to a cylindrical pipe, the hole pattern on each sheet has to be successively done in a wider spaced pattern for the outer sheets as compared to the inner sheets. This allows for the increased diameter of the sheet material that progresses from the inner sheet to the outer sheet in a stack.

Figure 7:
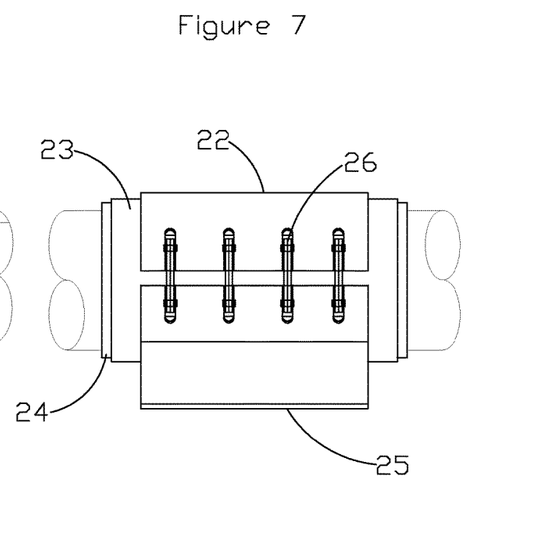
FIG. 7 shows a side view of a pipe insulation assembly and pipe according to a preferred embodiment of the invention.

FIG. 7 shows a side elevational view of insulation upper sheets 23 and insulation lower sheers 24 wrapped around a pipe, secured by top cradle 22 and bottom cradle 25 via bolts 26.

Figure 8:
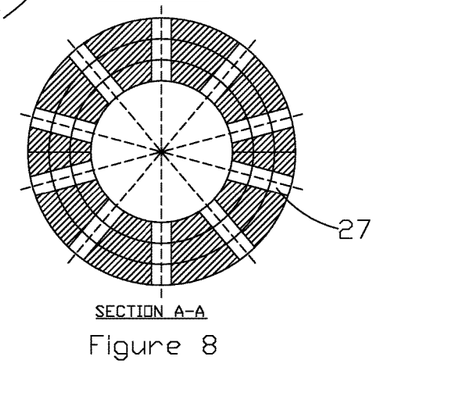
FIG. 8 shows a cross section along lines A-A of FIG. 6.

FIG. 8 shows a longitudinal cross sectional view along A-A of FIG. 6 having a series of sheets and block stiffeners 27 affixed about the pipe.

Figure 9:
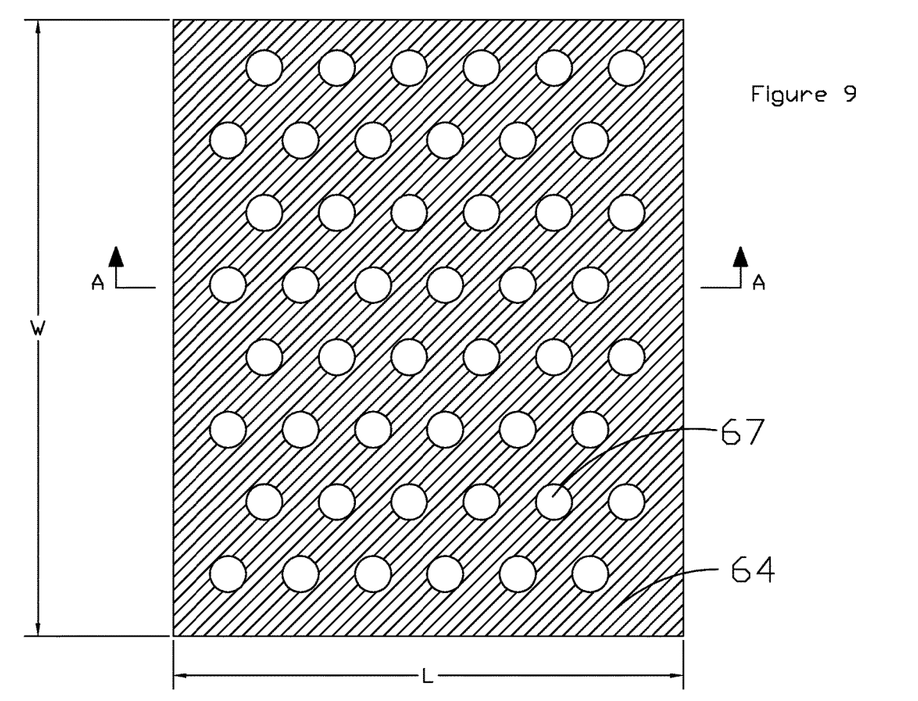
FIG. 9 shows a plan view of a section of insulation and hole pattern according to a preferred embodiment of the invention.

Thus, the hole pattern may be varied in a group of sheets to be honeycombed, rectilinear or offset as shown in FIG. 9, but each successive sheet will be slightly different in spacing to accommodate the changed radius of curvature for that sheet's location in the stack.

Figure 10:
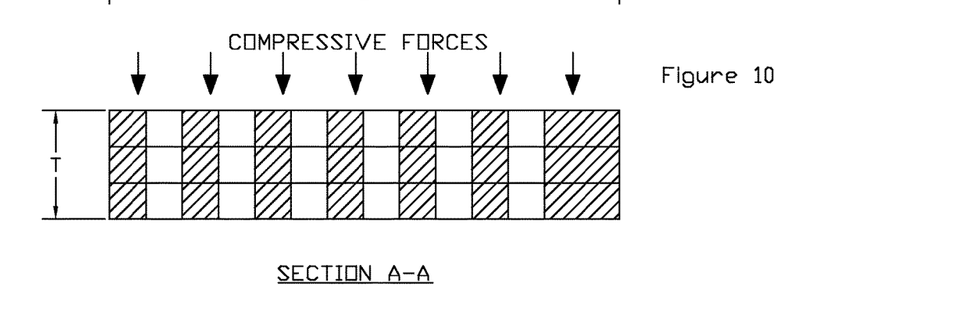
FIG. 10 shows a side cross sectional view of a series of sandwiched insulation sheets along the lines A-A of FIG. 9 according to a preferred embodiment of the invention.

FIG. 10 shows a side cross sectional view along A-A of FIG. 9 of a flat block embodiment where the insulation material is configured in a rectilinear block for placement under a structure needing insulation below it. The stiffener material is inserted into the cylindrical tube created by the series of holes in each successive layer to create a strong semi-rigid block that can withstand downward compressive forces as shown. In alternative embodiments where a flat or substantially flat reinforced insulation is needed, the hole pattern may be substantially the same from sheet to sheet so as to line up in cylindrical voids when placed in a stack of two or more sheets of insulation.

The hole pattern may be varied depending on the surface load of the pipe line or the tank being supported. When more strength is needed, the hole pattern may be more dense than in other situations requiring lesser strength. FIG. 9 shows a hole pattern that is honeycombed in configuration, but any of a variety of sizes or patterns may be employed and still accomplish the preferred result.

Figure 11:
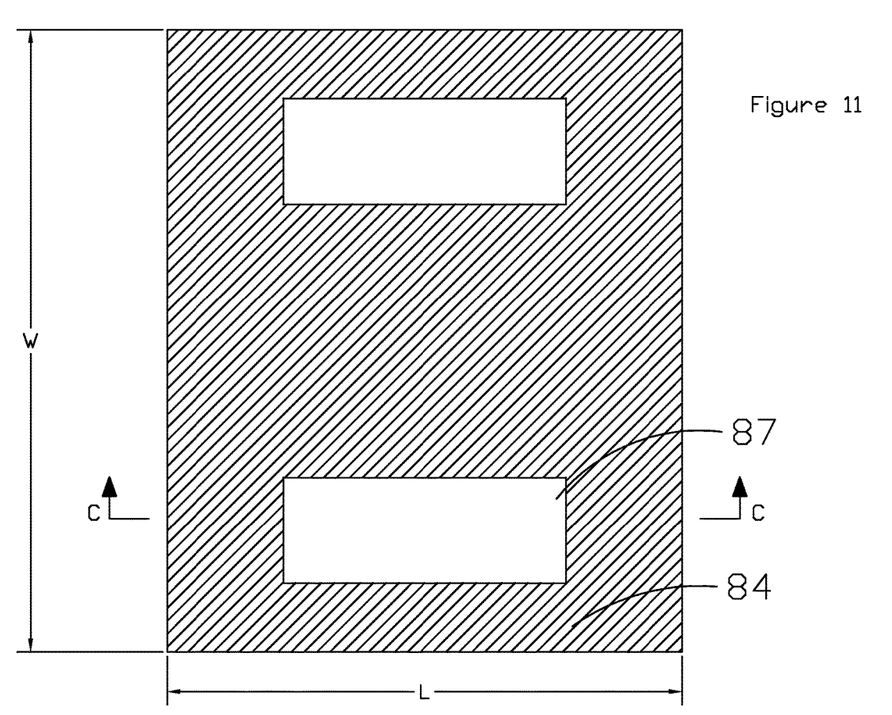
FIG. 11 shows a plan view of a section of insulation and hole pattern according to a preferred embodiment of the invention.

FIG. 11 shows a plan view of a sheet having a rectilinear or block void 87 in insulation material 84. A series of similar sheets may be stacked for either a circumferential configuration around a pipe or stacked in a single block for use under a tank.

Figure 12:
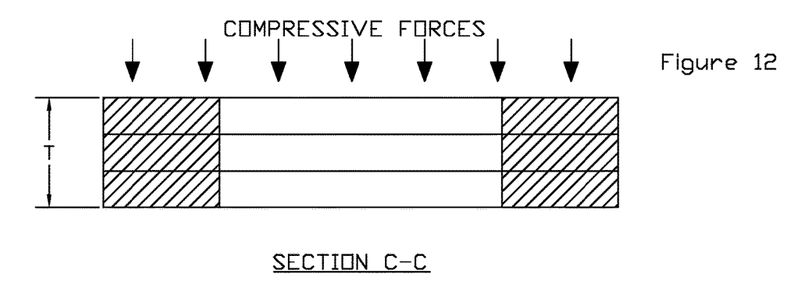
FIG. 12 shows a side cross sectional view of a series of sandwiched. insulation sheets along the lines C-C of FIG. 11 according to a preferred embodiment of the invention.

As shown in FIG. 12, which is a side cross sectional view along C-C of FIG. 11, the fully assembled group of sheets has a solid block of stiffener material disposed within the block the create a single piece resistant to downward compressive forces as shown. The stiffener material is inserted into the cylindrical tube created by the series of holes in each successive layer to create a strong semi-rigid block that can withstand downward compressive forces as shown. In alternative embodiments where a flat or substantially flat reinforced insulation is needed, the hole pattern may be substantially the same from sheet to sheet so as to line up in cylindrical voids when placed in a stack of two or more sheets of insulation. As is readily apparent, to configure a series of sheets that conform to a cylindrical pipe, the hole pattern on each sheet has to be successively done in a wider spaced pattern for the outer sheets as compared to the inner sheets. This allows for the increased diameter of the sheet material that progresses from the inner sheet to the outer sheet in a stack. Thus, the hole pattern may be varied in a group of sheets to be honeycombed, rectilinear or offset as shown in FIG. 9, but each successive sheet will be slightly different in spacing to accommodate the changed radius of curvature for that sheet's location in the stack. In alternative embodiments where a flat or substantially flat reinforced insulation is needed, the hole pattern may be substantially the same from sheet to sheet so as to line up in cylindrical voids when placed in a stack of two or more sheets of insulation.

Figure 13:
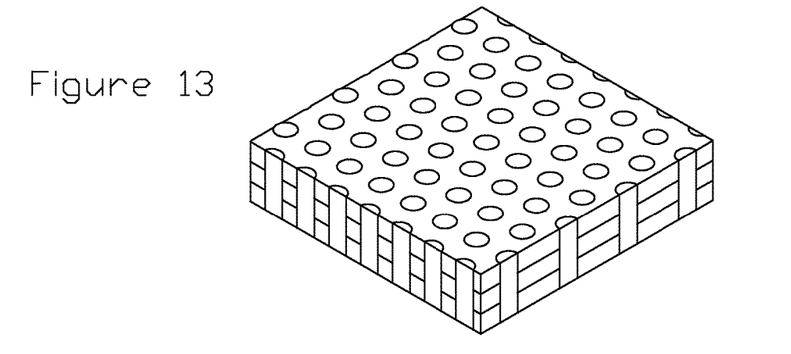
FIG. 13 shows a perspective view of three sandwiched insulation sheets having a hole pattern according to a preferred embodiment of the invention.

FIG. 13 shows a perspective view of a series of sheets that have been drilled with cylindrical holes for placement of reinforcing material. Once the material is applied, the insulation sheets form a stiff box with dowel like supports throughout the composite material.

Figure 14:
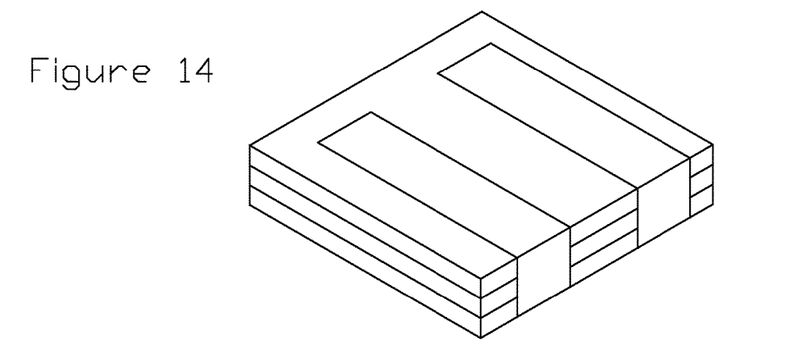
FIG. 14 shows a perspective view of three sandwiched insulation sheets having a reinforced patter according to a preferred embodiment of the invention.

FIG. 14 shows a similar effect with the block voids that run through the series of sheets.

Figure 15:
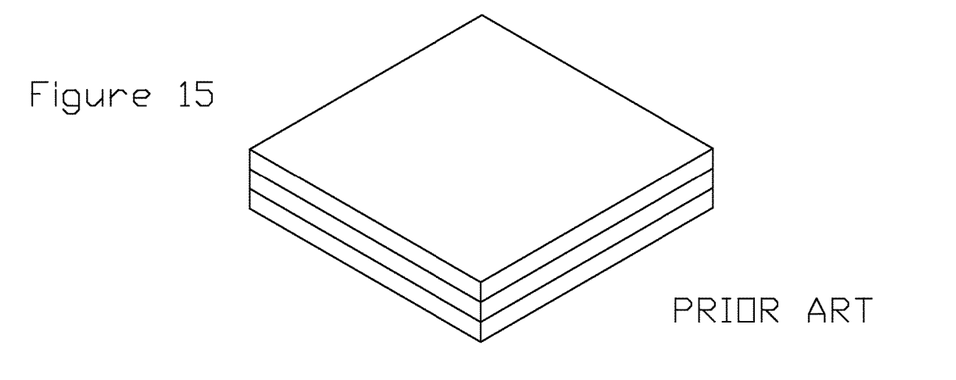
FIG. 15 shows three sandwiched insulation sheets according the prior art.

FIG. 15 shows prior art with simply a group of sheets piled onto each other. The prior art has the disadvantage of the sheets lacking any reinforcing quality and typically large numbers of sheets are required to achieve a similar insulating quality as those of the present invention.

Turning now to FIGS. 16A and 16B, there is shown a cross sectional view of a mold used to form one half of the cylindrical group of sheets that might be positioned about a pipe. Base 6 has a semicircular receptacle that is shaped to fit the outer diameter of the completed group of sheets. Successive sheets are positioned on top of each other on the mold in such a fashion as to line up the holes to form cylindrical tubes. This requires as previously noted for each successive sheet to have a slightly different hole pattern to fit the smaller radius presented at each level of the insulation assembly. Once the sheets are in place on the mold, a mating injector block 3 is placed over the inside layer of insulation with ports lined up for each cylindrical tube. Reinforcing material 2 is placed inside the injector block 3 and pressurized through input port 1 so that reinforcing material 2 is pushed into the various holes in the insulation. The insulation sheets are blocked off by end stops 4 so that reinforcing material is maintained within the sandwiched sheets.

Figure 16:
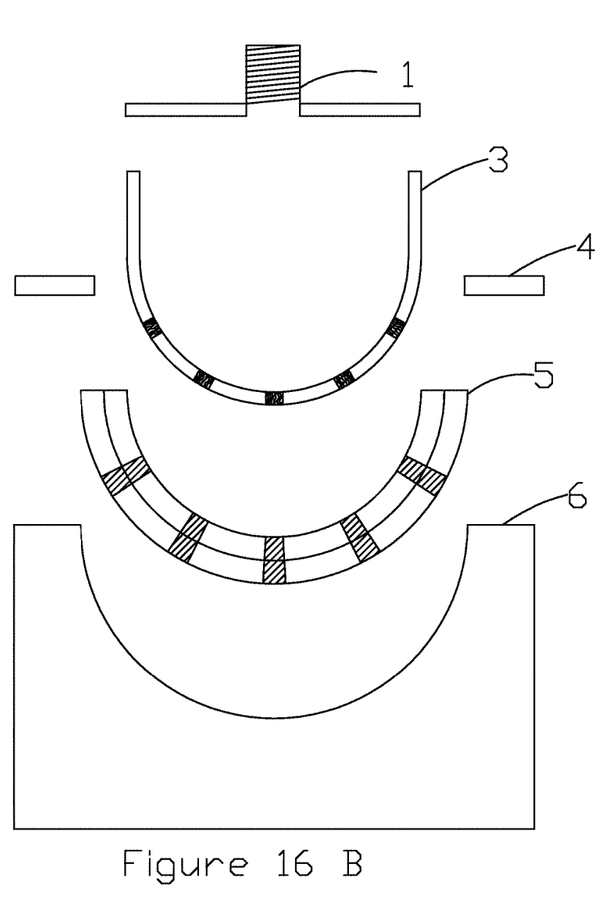
FIG. 16A shows a side cross sectional view of a mold that may be used in producing reinforced insulation according to a preferred embodiment of the invention.
FIG. 16B shows an exploded view of FIG. 16A.

As can be readily appreciated, reinforcing material may flow between the sheets in some preferred instances further reinforcing the sheets and adhering them to each other. FIG. 16 B shows an exploded view of the injection mold apparatus.

Once the hole or block pattern is created in the group of sheets that form one of the two semicircular insulation assemblies or other shapes, stiffeners must be added to the group of sheets to create the desired rigidity. The stiffener may be of any of a variety of materials, but preferably, it is an injection of resin into the cylindrical tubes that, once hardened, creates the structural integrity required. The resin may be of any of a variety of thermoplastic or adhesive type flowable material so long as it fills in the cylindrical voids in the pattern of holes for the group of sheets.

In a preferred embodiment, thermoplastic or other resin is injected into a mold that is configured to hold the upper group of sheets or lower group of sheets for the desired diameter of pipe. Once the sheets are aligned and placed in the mold, plastic, resin or other suitable hardening material is injected into the mold and fills the cylindrical voids. Additionally, it is preferred to inject sufficient material to not only fill the cylindrical voids but to flow material between the sheets for added rigidity. By doing this, a series of hardened rods or cylinders are created transverse to the plane of the sheets as well as material between and on the surface of each sheet that then forms a portion of the curved configuration of the assembled sheets.

When fully injected and hardened, the several sheets have a series of radial stiffener spokes perpendicular to the outer diameter of the subject pipe, and a group of semicircular stiff sheets between each of the insulation sheets. This creates a very strong insulating layer as shown in FIGS. 10 and 12 capable of withstanding increased compressive forces applied across the insulation layers when positioned in the cradles about the pipe.

In alternative embodiments, the stiffeners could be individual rigid members such as pegs or dowels made of any of a variety of materials. Each cylindrical void would be filled with one or more such pegs or dowels to create a reinforced group of sheets. The pegs or dowels could be affixed with glues, thermoplastic or other adhesives placed around the pegs or dowels.

The invention claimed is:

1. A reinforced insulation material for supporting a pipe or tank, said material comprising:
   a. A plurality of sandwiched flexible sheets of the same insulation material, each sheet having a plurality of voids, said sandwiched configuration has exposed upper and lower surfaces;
   b. Said voids on each sheet oriented in a mating pattern to said voids on said other sheets to form cylindrical voids through said sheets when connected together;
   c. A dowel inserted into said voids of each sheet to connect said sheets to form a non-compressible rigid unified body, having exposed surfaces defined by said upper and lower surfaces of the sandwiched configuration wherein said rigid unified body is adapted to support and insulate the pipe or tank; and
   d. An end block on at least one edge of said sandwiched sheets.

2. The reinforced insulation material of claim 1 further comprising flowable synthetic material applied partially between said sheets.

3. The reinforced insulation material of claim 1 further comprising flowable synthetic inserted in said cylindrical voids.

4. The reinforced insulation material of claim 1 further comprising adhesive material partially inserted between said sheets.

5. The reinforced insulation material of claim 1 wherein said unified body is generally configured in a semicircular arrangement.

6. The reinforced insulation material of claim 1 further comprising a plurality of voids on each sheet in a honeycombed pattern.

* * * * *